(12) United States Patent
Kwon et al.

(10) Patent No.: US 11,219,058 B2
(45) Date of Patent: *Jan. 4, 2022

(54) METHOD AND TERMINAL FOR REQUESTING AND ACQUIRING INFORMATION RELATING TO CHANNEL ACCESS IN WIRELESS LAN, AND APPARATUS FOR PROVIDING INFORMATION RELATING TO CHANNEL ACCESS IN WIRELESS LAN

(71) Applicant: ELECTRONICS AND TELECOMMUNICATIONS RESEARCH INSTITUTE, Daejeon (KR)

(72) Inventors: Hyoung Jin Kwon, Daejeon (KR); Jae Seung Lee, Daejeon (KR); Min ho Cheong, Seoul (KR); Hee Jung Yu, Daejeon (KR); Sok Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/730,648

(22) Filed: Dec. 30, 2019

(65) Prior Publication Data

US 2020/0137791 A1   Apr. 30, 2020

Related U.S. Application Data

(63) Continuation of application No. 14/407,855, filed as application No. PCT/KR2013/005214 on Jun. 13, 2013, now Pat. No. 10,555,336.

(30) Foreign Application Priority Data

Jun. 13, 2012 (KR) .................. 10-2012-0063153
Jun. 12, 2013 (KR) .................. 10-2013-0067119

(51) Int. Cl.
*H04W 74/00* (2009.01)
*H04W 48/14* (2009.01)

(52) U.S. Cl.
CPC .......... *H04W 74/002* (2013.01); *H04W 48/14* (2013.01)

(58) Field of Classification Search
CPC ............. H04W 84/12; H04W 52/0216; H04W 52/0229; H04W 52/02; H04W 72/0446
See application file for complete search history.

(56) References Cited

U.S. PATENT DOCUMENTS

2007/0147330 A1* 6/2007 Smith ............... H04W 52/0229
370/346
2008/0013519 A1   1/2008 Kwon et al.
(Continued)

FOREIGN PATENT DOCUMENTS

CN       101321106       12/2008
CN       101455004        6/2009
(Continued)

OTHER PUBLICATIONS

ISO-IEC 8802-11 1999 IEEE Std 802.11-1999(R2003))] Information technology—Telecommunications and information exchange between systems—Local and metropolitan area networks—Specific requirements—Part 11 section 9.2.5.3 (Year: 2003).*
(Continued)

*Primary Examiner* — Hassan Kizou
*Assistant Examiner* — Hector Reyes (57) ABSTRACT

The present invention relates to a terminal for requesting and acquiring information relating to channel access in a wire-
(Continued)

less LAN, and to an apparatus for providing information relating to channel access in a wireless LAN. The terminal for requesting and acquiring information relating to channel access in a wireless LAN according to one embodiment of the invention verifies the reception of a beacon during a preset beacon interval, if it is verified that the beacon has not been received, transmits a group and slot information request signal, and receives, from an access point, a group and slot information response signal as a response to the group and slot information request signal.

13 Claims, 5 Drawing Sheets

(56) References Cited

U.S. PATENT DOCUMENTS

| | | |
|---|---|---|
| 2010/0157955 A1 | 6/2010 | Liu et al. |
| 2011/0116430 A1 | 6/2011 | Kim et al. |
| 2011/0264950 A1 | 10/2011 | Baptist et al. |
| 2012/0057620 A1 | 3/2012 | Yamamoto et al. |
| 2013/0128798 A1* | 5/2013 | Liu .................. H04W 74/0875 370/312 |
| 2013/0128867 A1* | 5/2013 | Calcev ................ H04L 69/323 370/336 |
| 2013/0235720 A1* | 9/2013 | Wang ................ H04W 52/0219 370/229 |
| 2013/0329620 A1* | 12/2013 | Kim .................. H04W 74/006 370/311 |
| 2015/0009878 A1* | 1/2015 | Kim ..................... H04W 4/70 370/311 |
| 2015/0036572 A1* | 2/2015 | Seok ................... H04W 84/12 370/311 |
| 2015/0057008 A1* | 2/2015 | Seok ................... H04L 5/0092 455/452.1 |
| 2015/0124784 A1* | 5/2015 | Choi ................... H04W 72/02 370/336 |

FOREIGN PATENT DOCUMENTS

| | | |
|---|---|---|
| CN | 101815065 A | 8/2010 |
| CN | 102067634 | 5/2011 |
| CN | 102223690 A | 10/2011 |
| KR | 1020110128147 A | 11/2011 |

OTHER PUBLICATIONS

Chu, Liwen et al., Enhancement of Low Power Medium Access STA, IEEE 802.11-12/0343r3, May 14, 2012, pp. 1-5.

Ghosh, Chittabrata et al., Group Synchronized DCF, IEEE 802.11-12/0329r1, Mar. 12, 2012, pp. 1-13.

International Search Report for PCT/KR2013/005214 filed on Jun. 13, 2013.

Liu, Siyang et al., DCF Enhancements for large Number of STA, IEEE 802.11-11/1255r0, Sep. 15, 2011, pp. 1-11.

Park, Min Young et al., Uplink channel Acces, IEEE 802.11-12/0606r1, May 14, 2012, pp. 1-21.

* cited by examiner

METHOD AND TERMINAL FOR REQUESTING AND ACQUIRING INFORMATION RELATING TO CHANNEL ACCESS IN WIRELESS LAN, AND APPARATUS FOR PROVIDING INFORMATION RELATING TO CHANNEL ACCESS IN WIRELESS LAN

CROSS-REFERENCE TO RELATED APPLICATIONS

The present application is a Continuation of U.S. application Ser. No. 14/407,855, filed Dec. 12, 2014, which is a National Stage Entry of PCT/KR2013/005214, filed Jun. 13, 2013, which claim priority to and the benefit of Korean Application Nos. 10-2013-0067119, filed Jun. 12, 2013 and 10-2012-0063153, filed Jun. 13, 2012.

TECHNICAL FIELD

The present invention relates to a terminal for requesting and acquiring information associated with a channel access in a wireless local area network (WLAN) and an apparatus for providing information associated with the channel access in a WLAN.

BACKGROUND ART

In a wireless local area network (WLAN) environment, a beacon sent by an access point (AP) includes information for use in network management. For example, the information may include a timestamp for synchronization, a traffic indication map (TIM) indicating that data for transmission to terminals, for example, stations (STAs) is buffered, a contention-free (CF) parameter set indicating information associated with a contention-free period using a point coordination function (PCF), and the like.

However, when an STA does not listen to the beacon, an intended operation may not be performed by the AP because information for use in network management is not acquired.

In general, the STA may await a subsequent beacon to acquire the information for use in network management and operation. When the intended operation of the AP is not performed for each beacon and has a longer cycle, the STA may need to await a corresponding cycle since the STA may not operate despite listening to the subsequent beacon.

Accordingly, when the STA does not listen to a beacon, a method for requesting required information without awaiting a subsequent beacon is required.

DISCLOSURE OF INVENTION

Technical Goals

An aspect of the present invention provides a method of enabling a terminal (STA), not listening to a beacon, to request required information directly from an access point (AP), acquire the required information, and perform a subsequent operation, and thereby perform a channel access operation intended by the AP.

Another aspect of the present invention also provides a method of enabling an STA to use a resource allocated by an AP in an intended manner or acquire buffered data.

Another aspect of the present invention also provides a method that may reduce an amount of power used due to a competition in a channel access process and improve an overall network performance through a decrease in a probability of collisions occurring by enabling an AP to request information associated with the intended operation or regulation directly from an STA and acquire the information when the STA is in possession of the intended operation or regulation, in order to decrease the probability of collisions occurring and solve an issue caused by a hidden node.

TECHNICAL SOLUTIONS

According to an aspect of the present invention, there is provided a terminal for requesting and acquiring information associated with a channel access in a wireless local area network (WLAN), the terminal including a verifier to verify whether a beacon is received during a predetermined beacon interval, a transmitter to transmit a group and slot information request signal when the beacon is verified not to be received, and a receiver to receive a group and slot information response signal in response to the group and slot information request signal from an access point (AP).

The transmitter may transmit a group and slot information request frame, and the group and slot information request frame may include an identifier indicating a request for information associated with a group identifier (ID) allocated for each restricted access window (RAW), and a start time of the RAW and an RAW duration.

When a terminal is accessible for each slot allocated by the AP, the group and slot information request frame may include an identifier indicating a request for information associated with a slot allocated to the terminal and duration of the allocated slot.

The terminal for requesting and acquiring information associated with a channel access in a WLAN may further include an accessor to be synchronized with the AP based on a timestamp included in the group and slot information request signal, and to perform a channel access based on a group ID allocated for each RAW, a start time of the RAW, and an RAW duration included in the group and slot information request signal.

The accessor may perform the channel access based on information associated with a slot allocated to a terminal and the duration of the allocated slot included in the group and slot information response signal.

The transmitter may transmit a power save (PS)-poll frame or a trigger frame as the group and slot information request signal, and the PS-poll frame or the trigger frame may include an identifier indicating a request for information associated with a group ID allocated for each RAW, and a start time of the RAW and an RAW duration.

According to an aspect of the present invention, there is provided a terminal for requesting and acquiring information associated with a channel access in a WLAN without listening to a beacon, the terminal including a transmitter to transmit a group and slot information request signal through a sensed channel after the terminal wakes up, and a receiver to receive, from an AP, a group and slot response signal in response to the group and slot information request signal.

The transmitter may transmit a PS-poll frame or a trigger frame as the group and slot information request signal, and the PS-poll frame or the trigger frame may include an identifier indicating a request for information associated with a group ID allocated for each RAW, and a start time of the RAW and an RAW duration.

When a terminal not included in a traffic indication map (TIM) is accessible for each slot allocated by the AP, the PS-poll frame or the trigger frame may include an identifier indicating a request for information associated with a slot allocated to the terminal and duration of the allocated slot.

According to an aspect of the present invention, there is provided an apparatus for providing information associated with a channel access in a WLAN, the apparatus including an allocator to allocate group and slot information associated with a terminal, a receiver to receive a group and slot information request signal from the terminal, and a transmitter to transmit a group and slot information response signal including the allocated group and slot information in response to the group and slot information request signal.

The group and slot information may include information associated with a group ID allocated for each RAW and an RAW duration.

When a terminal is accessible for each slot allocated by the AP, the group and slot information request frame may include an identifier indicating a request for information associated with a slot allocated to the terminal and duration of the allocated slot.

The allocator may include a determiner to determine a location of a slot using a function mapped in a location of a bit set as "1" on a TIM indicating whether data buffered for each terminal exists.

The allocator may allocate a terminal for each slot on a defined map separate from a TIM.

The receiver may receive a PS-poll frame or a trigger frame as the group and slot information request signal, and the transmitter may transmit an acknowledgement (ACK) frame including information for notifying a subsequent transmission of the group and slot information response signal in response to the PS-poll frame or the trigger frame.

The ACK frame may include information associated with a transmission time of a group and slot information response frame.

The transmission time may be set based on an allocation section of an RAW or an allocation section of a slot.

The ACK frame may include duration field indicating information associated with a wakeup time of a non-TIM station (STA).

A value set in the duration field may be used to provide a start time of an allocated slot or a start time of a competitive RAW.

According to an aspect of the present invention, there is provided a method of requesting and acquiring information associated with a channel access in a WLAN, the method including verifying whether a beacon is received during a predetermined beacon interval, transmitting a group and slot information request signal when the beacon is verified not to be received, and receiving, from an AP, a group and slot information response signal in response to the group and slot information request signal.

Effect of the Invention

According to embodiments of the present invention, it is possible to solve an issue of, for example, wasting a resource allocated from an access point (AP) and discarding a buffered frame, by enabling an STA not listening to a beacon to request information required directly from the AP to perform a channel access operation intended by the AP and acquire the information.

According to embodiments of the present invention, it is possible to improve an overall network performance by decreasing a collision occurrence probability and reduce an amount of a power of an STA by enabling the STA to adapt to an intended operation or regulation, in order to decrease a probability of collisions occurring or solve an issue caused by a hidden node.

According to embodiments of the present invention, it is possible to decrease an occurrence of collisions between a non-traffic indication map (TIM) STA and an STA to which a resource is allocated in advance by enabling an AP to perform an operation or regulation intended to an STA, in order to decrease the probability of collisions occurring or solve an issue caused by a hidden node.

BEST MODE FOR CARRYING OUT THE INVENTION

Hereinafter, embodiments will be described in detail with reference to the accompanying drawings.

Figure 1:
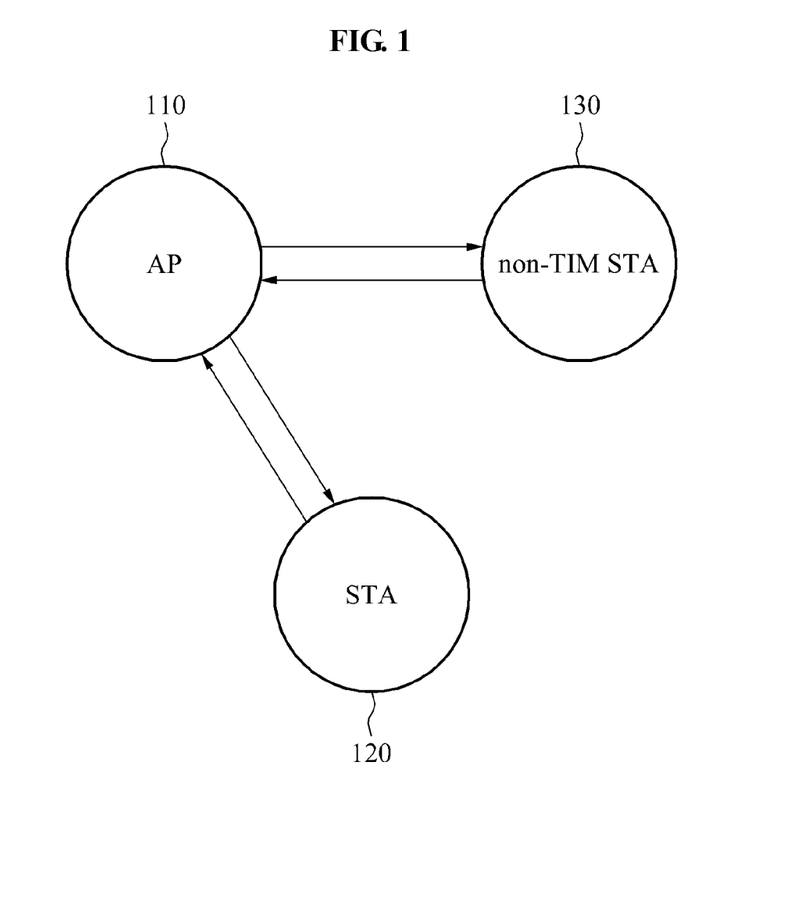
FIG. 1 illustrates a wireless local area network (WLAN) environment including a plurality of terminals and an access point (AP) to which an example embodiment of the present invention may be applied.

FIG. 1 illustrates a wireless local area network (WLAN) environment including a plurality of terminals and an access point (AP) to which an example embodiment of the present invention may be applied.

Referring to FIG. 1, an AP 110 may transmit a beacon including information for use in periodic network management. In this instance, an STA 120 may not listen to the beacon due to a collision caused by a hidden node or an unmatched synchronization, and a non-traffic indication map (TIM) STA 130 does not listen to the beacon. Accordingly, to manage the network in an intended manner in the AP 110, the STA 120 and the non-TIM STA 130 may need to acquire allocated information in the AP 110.

In addition, when the AP 110 groups STAs into groups and restricts a channel access for each group to decrease a probability of collisions occurring between the STAs, for example, a plurality of non-TIM STAs 130, or when the AP 110 allows the channel access based on a slot to reduce an influence of the hidden node, group configuration and channel access schedule information and information associated with a slot may need to be transferred to the STAs using the beacon.

As another example, in terms of a slot-based channel access, an STA may need to be notified of at least slot duration information so that a channel access operation is performed by the STA to a predetermined slot because the STA performs a channel access based on a predetermined slot unit.

The STA 120 and the non-TIM STA 130 may request required information directly from the AP 110.

For example, the AP 110 may insert schedule and resource allocation information including group and slot information to a beacon and thus, broadcast the beacon. The STA 120 may transfer a group and slot information request frame to the AP 110 when it is determined that the AP 110 does not listen to the broadcast beacon.

The group and slot information request frame may include group and slot information using various information elements (IEs).

When the AP 110 uses a restricted access window (RAW) restricting a channel access for each group of terminals, information associated with a group identifier (ID) allocated for each RAW, an RAW start time, and an RAW duration may be newly defined in a form of an IE, and broadcast through being inserted in the beacon. The RAW may refer to a restricted section predetermined to allow a channel access for each group. The STA 120 and the non-TIM STA 130 may insert an endemic ID that may be used to identify information associated with the RAW to the group and slot information request frame and transfer the group and slot information request frame.

As another example, when the AP 110 restricts the channel access for each slot, the STA 120 and the non-TIM STA 130 may request information allocated to the STA 120 and the non-TIM STA 130. The AP 110 may allocate a slot to the STA 120 using a function mapped in a location of a bit set as "1" of a TIM inserted to the beacon. In addition, the AP 110 may define a separate map different from a TIM to allocate an STA for each slot using the separate map, and thereby allocate the slot to the STA 120 and the non-TIM STA 130.

The STA 120 and the non-TIM STA 130 may request map information from the AP 110 in order to verify a slot allocated to the STA 120 and the non-TIM STA 130. The group and slot information request frame may include a field indicating an ID identifying a request for map information.

The AP 110 may receive the group and slot information request frame, and transmit a group and slot information response frame.

The AP 110 receiving the group and slot information request frame may be synchronized with the AP 110 using a timestamp, and perform a channel access for each group based on the received group and slot information, or perform the channel access in the allocated slot.

The group and slot information request frame may be substituted for with a power save (PS)-poll frame or a trigger frame used in the Institute of Electrical and Electronics Engineers (IEEE) 802.11 standard.

The STA 120 may wait for the beacon for a predetermined period from a target beacon transmit time (TBTT) when a transmission of the beacon is estimated. The STA 120 not listening to the beacon may transmit the PS-poll frame in lieu of the group and slot information request frame defined in advance. In this instance, a field may be newly defined in the PS-poll frame, and be used to request group and slot information.

The AP 110 received the PS-poll frame may be operated through use of one of the following methods. The AP 110 may directly transmit the group and slot information response frame. Alternatively, the AP 110 may notify the STA 120 that the group and slot information response frame may be transmitted after acquiring a channel.

The AP 110 may notify the STA 120 of a transmission of the group and slot information response frame by setting a more data field of an acknowledgement (ACK) frame as "1". Alternatively, the AP 110 may include a transmission time of the group and slot information response frame in the ACK frame. Information associated with a transmission time may be an absolute time, or a section or a slot allocated based on the RAW used in the AP 110.

The AP 110 may insert a duration field to the ACK frame. The duration field may be used to enable the STA 120 or the non-TIM STA 130 receiving the ACK frame to operate in a sleep mode during a period of time indicated in the duration field. After the duration ends, the duration field may be used to provide information for waking up the STA 120 and the non-TIM STA 130.

Since a predetermined value of the duration field may be used as an indicator indicating a next TBTT, the STA 120 and the non-TIM STA 130 may predict a subsequent time for listening to the beacon, based on a value indicated in the duration field.

Using the duration field, information associated with a slot being allocated to the STA 120 or the non-TIM STA 130 may be transferred. For example, information associated with a temporarily allocated slot or a start time of a competing RAW may be transferred using the duration field.

A group and slot information request mechanism described in the present invention may use the STA 120 failing to listen to the beacon and the non-TIM STA 130 that is not included in a TIM because the non-TIM STA 130 does not listen to the beacon. Such a non-TIM STA 130 may refer to an STA for a sensor that has a low duty cycle and high requirements for saving power. Thus, an operation of listening to the beacon for verifying the TIM may place a burden on the non-TIM STA 130. Accordingly, the non-TIM STA 130 may wake up without listening to the beacon, sense a channel, and transmit uplink data. Alternatively, when the UL data is absent, the non-TIM STA 130 may transmit the PS-poll frame or the trigger frame to verify a downlink (DL).

After waking up without listening to the beacon, the non-TIM STA 130 may insert an identifier requesting a change sequence and/or a current timestamp of a basic service set of network to the PS-poll frame. By way of transmitting the PS-poll frame, the non-TIM STA 130 may request the change sequence and/or a current timestamp of the BSS of network to the AP 110. For example, a timing synchronization function (TSF) may be used as a timestamp.

In response to the received PS-poll frame, the AP 110 may transmit the change sequence and/or a current timestamp of the BSS of network directly to the non-TIM STA 130 using a target wake time ACK (TACK) frame.

Also, in response to the received PS-poll frame, the AP may transmit the ACK frame by inserting the duration field, or transmit the TACK frame by setting information associated with the TBTT. The non-TIM STA 130 may wake up based on a predetermined value in the duration field of the ACK frame, and acquire the change sequence and/or the current timestamp of the BSS using the received beacon. Alternatively, the non-TIM STA 130 may wake up based on the TBTT of the TACK frame, and acquire the change sequence and/or the current timestamp of the BSS using the received beacon.

The AP 110 may allocate, to the non-TIM STA 130, a slot in which data to be transmitted is empty, and the non-TIM STA 130 may transmit the UL data at a corresponding time. In this instance, the non-TIM STA 130 may transmit the PS-poll frame or the trigger frame by including the group and slot information request frame therein. In response thereto, the AP 110 may transmit the aforementioned group and slot information frame.

In this instance, the group and slot information response frame may include group information such as the RAW, and slot information, for example, the slot duration, and newly allocated slot information. The non-TIM STA 130 received the group and slot information response frame may move to a corresponding slot and exchange data.

Figure 2:
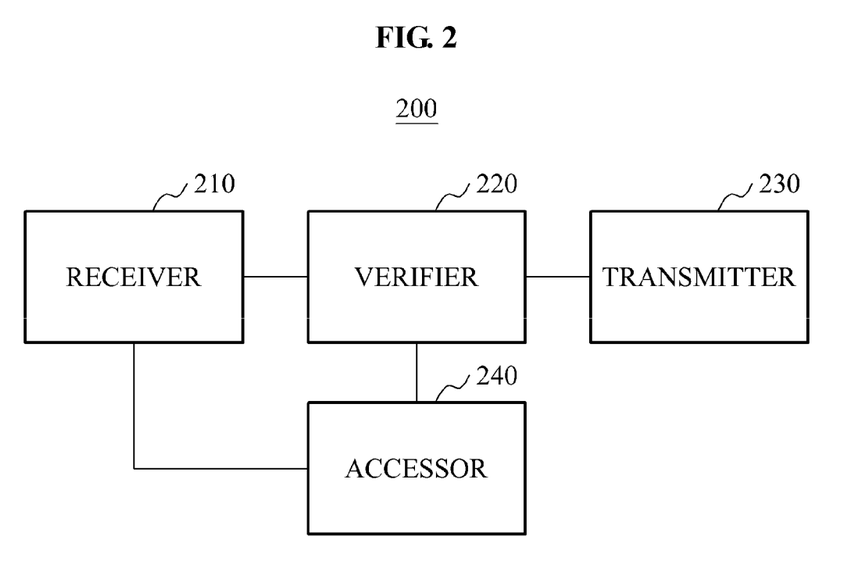
FIG. 2 illustrates a block diagram of a terminal for requesting and acquiring information associated with a channel access in a WLAN according to an embodiment of the present invention.

FIG. 2 illustrates a block diagram of a terminal for requesting and acquiring information associated with a channel access in a WLAN according to an embodiment of the present invention.

Referring to FIG. 2, a terminal 200 for requesting and acquiring information associated with a channel access in a WLAN may include a receiver 210, a verifier 220, a transmitter 230, and an accessor 240.

The receiver 210 may receive a group and slot information response signal in response to a group and slot information request signal from an AP.

The verifier 220 may verify whether a beacon is received during a predetermined beacon interval.

The transmitter 230 may transmit the group and slot information request signal to the AP when the beacon is verified not to be received.

The transmitter 230 may transmit a group and slot information response frame. Here, the group and slot information request frame may include an identifier. As an example, the identifier may indicate a request for information associated with a group ID allocated for each RAW, a start time of the RAW, and an RAW duration.

When a terminal is accessible for each slot allocated by the AP, the group and slot information request frame may include an identifier indicating a request for information associated with a slot allocated to the terminal and a duration of the allocated slot.

The accessor 240 may be synchronized with the AP based on a timestamp included in the group and slot information response signal. The accessor 240 may perform a channel access based on the group ID allocated for each RAW, the start time of the RAW, and the RAW duration included in the group and a slot information request signal. The RAW may be allocated for each group grouped in advance. The terminal 200 of a corresponding group in a section of the RAW may wake up, and subsequently perform the channel access.

The accessor 240 may perform the channel access based on information associated with a slot allocated to a terminal and a duration time of the allocated slot included in the group and slot information response signal. The accessor 240 may perform the channel access in the allocated slot section.

The transmitter 230 may transmit a PS-poll frame or a trigger frame as the group and slot information request signal. In this instance, the PS-poll frame of the trigger frame may include an identifier indicating a request for information associated with a group ID allocated for each RAW, and a start time and an RAW duration.

Figure 3:
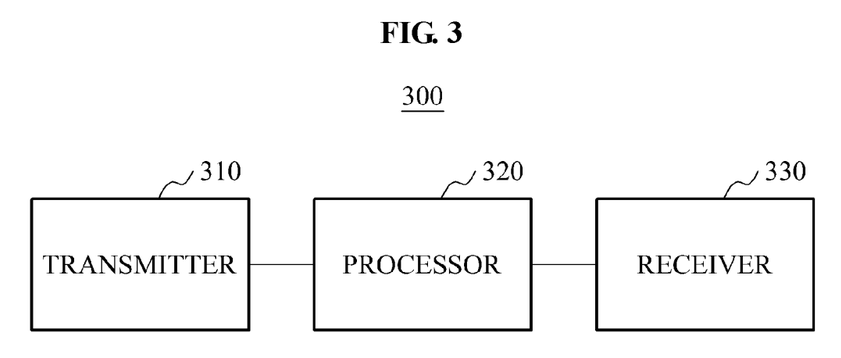
FIG. 3 illustrates a block diagram of a terminal for requesting and acquiring information associated with a channel access without listening to a beacon in a WLAN according to an embodiment of the present invention.

FIG. 3 illustrates a block diagram of a terminal for requesting and acquiring information associated with a channel access in a WLAN without listening to a beacon according to an embodiment of the present invention.

Referring to FIG. 3, a terminal 300 according to an example embodiment may include a transmitter 310, a processor 320, and a receiver 330.

The transmitter 310 may wake up, and subsequently transmit a group and slot information request signal through a sensed channel. Here, the terminal 300 corresponds to the non-TIM STA 130 of FIG. 1.

The processor 320 may sense a channel, and perform a channel access based on information associated with an RAW included in the group and slot information response signal or perform the channel access based on allocated slot information.

The receiver 330 may receive, from an AP, a group and slot information response signal in response to the group and slot information request signal.

The transmitter 310 may transmit a PS-poll frame or a trigger frame as the group and slot information request signal. In this instance, the PS-poll frame or the trigger frame may include an identifier indicating a request for information associated with a group ID allocated for each RAW, and a start time of the RAW and an RAW duration.

When the terminal 300 is not included in a TIM accessible for each slot allocated by the AP, the PS-poll frame of the trigger frame may also include an identifier indicating a request for information associated with a slot allocated to the terminal 300 and a duration of the allocated slot.

Figure 4:
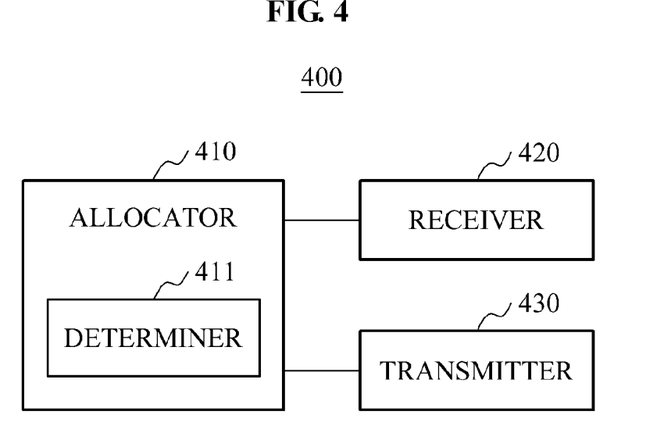
FIG. 4 illustrates a block diagram of an apparatus for providing information associated with a channel access in a WLAN according to an embodiment of the present invention.

FIG. 4 illustrates a block diagram of an apparatus for providing information associated with a channel access in a WLAN according to an embodiment of the present invention.

Referring to FIG. 4, an apparatus for providing information associated with a channel access in a WLAN according to an example embodiment may include an allocator 410, a receiver 420, and a transmitter 430.

The allocator may allocate group and slot information associated with a terminal.

The group and slot information may include information associated with a group ID allocated for each RAW, a start time of the RAW, and an RAW duration.

When the terminal is accessible for each slot allocated by the AP, the group and slot information may include information associated with a slot allocated to the terminal and a duration of the allocated slot.

The allocator 410 may include a determiner 411.

The determiner 411 may determine a location of a slot using a function mapped in a location of a bit set as "1" on a TIM indicating whether data buffered for each terminal exists.

In addition, the allocator 410 may allocate a terminal for each slot on a defined map, separate from a TIM.

The receiver 420 may receive a group and slot information request signal. The group and slot information request signal may include a request message or an identifier of map information indicating allocated slot information.

The transmitter 430 may transmit a group and slot information response signal including the allocated group and slot information in response to the group and slot information request signal.

The receiver 420 may receive a PS-poll frame or a trigger frame as the group and slot information request signal. In this instance, the PS-poll frame or the trigger frame may include an identifier indicating a request for group and slot information.

The transmitter 430 may transmit an ACK frame including information for notifying subsequent transmission of the group and slot information response signal in response to the PS-poll frame or the trigger frame. For example, the ACK frame may be an immediate ACK frame. The ACK frame may include information associated with a transmission time of a group and slot information response frame, and the transmission time may be set based on an allocated section of an RAW or an allocated section of a slot.

Figure 5:
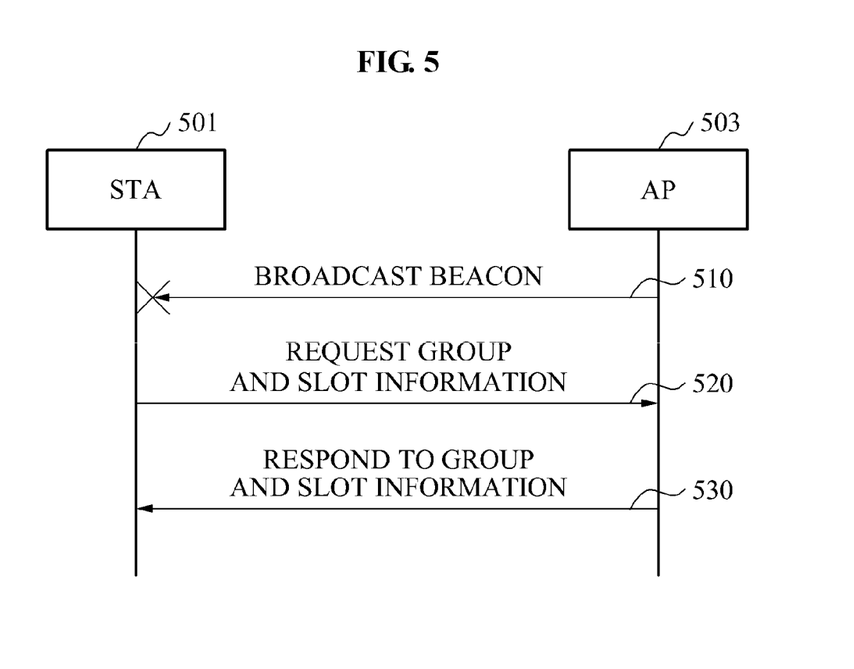
FIG. 5 illustrates a method of requesting and acquiring information associated with a channel access in a WLAN according to an embodiment of the present invention.

FIG. 5 illustrates a method of requesting and acquiring information associated with a channel access in a WLAN according to an embodiment of the present invention.

In operation 510, an AP 503 may broadcast a beacon by including information for use in network management. An STA 501 may not listen to the beacon due to a collision caused by a hidden node or an unmatched synchronization.

In operation 520, the STA 501 may request group and slot information to the AP 503 when the STA 501 may fail to listen to the beacon. The STA 501 may transmit a group and slot request frame. The group and slot request frame may include an identifier. The identifier may indicate a request for information associated with a group ID allocated for each RAW, a start time of the RAW, and an RAW duration.

When the STA 501 is accessible for each slot allocated by an AP, the group and slot information request frame may include an identifier indicating a request for information associated with a slot allocated to the STA 501 and a duration of the allocated slot.

In operation 530, the AP 503 may provide a group and slot information response signal in response to a group and slot information request.

The STA 501 may be synchronized with the AP 503 based on a timestamp included in the group and slot information response signal. The STA 501 may perform a channel access based on a group ID allocated for each RAW, a start time of the RAW, and an RAW duration. The RAW may be allocated for each group grouped in advance.

The STA 501 may perform the channel access based on information associated with a slot allocated to the STA 501 and a duration of the allocated slot, included in the group and slot information response signal.

The method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy discs, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A terminal for communicating in a channel access in a wireless local area network (WLAN), the terminal comprising:
   a transmitter to transmit a power save (PS)-poll frame for requesting an access point (AP) to reschedule the terminal, wherein the terminal is a station that needs not to listen to a traffic indication map (TIM) beacon frame; and
   a receiver to receive an acknowledgement (ACK) frame from the AP in response to the PS-poll frame, wherein the ACK frame comprises a duration field indicating information of a next TBTT (Target Beacon Transmit Time) associated with a wakeup time of the terminal for listening to the TIM beacon frame,
   wherein the PS-poll frame comprises an identifier indicating a request for information associated with a group identifier (ID) allocated for each restricted access window (RAW), a start time of the RAW, and an RAW duration, and
   wherein the terminal wakes up based on the information of the next TBTT and receives the TIM beacon frame based on the information of the next TBTT.

2. The terminal of claim 1, wherein when the terminal is accessible for each slot allocated by the AP, the PS-poll frame comprises an identifier indicating a request for information associated with a slot allocated to the terminal and a duration of the allocated slot.

3. The terminal of claim 1, further comprising:
   an accessor to be synchronized with the AP based on a timestamp included in the PS-poll frame, and to perform a channel access based on the group ID allocated for each RAW, the start time of the RAW, and the RAW duration included in the PS-poll frame.

4. The terminal of claim 3, wherein the accessor performs the channel access based on information associated with a slot allocated to the terminal and the duration of the allocated slot included in a group and slot information response signal.

5. An access point (AP) for communicating in a wireless local area network (WLAN), the AP comprising:
   a receiver to receive a power save (PS)-poll frame for requesting the AP to reschedule a terminal from the terminal, wherein the terminal is a station that needs not to listen to a traffic indication map (TIM) beacon frame; and
   a transmitter to transmit an acknowledgement (ACK) frame to the terminal in response to the PS-poll frame, wherein the ACK frame comprises a duration field indicating information of a next TBTT (Target Beacon Transmit Time) associated with a wakeup time of terminal for listening to the TIM beacon frame,
   wherein the PS-poll frame comprises an identifier indicating a request for information associated with a group identifier (ID) allocated for each restricted access window (RAW), a start time of the RAW, and an RAW duration, and
   wherein the terminal wakes up based on the information of the next TBTT and receives the TIM beacon frame based on the information of the next TBTT.

6. The AP of claim 5, wherein when the terminal is accessible for each slot allocated by the AP, the PS-poll frame comprises an identifier indicating a request for information associated with a slot allocated to the terminal and a duration of the allocated slot.

7. The AP of claim 5, further comprising:
   a processor to determine a location of a slot using a function mapped in a location of a bit set as "1" on a traffic indication map (TIM) indicating whether data buffered for each terminal exists.

8. The AP of claim 5, further comprising: a processor to allocate the terminal for each slot on a defined map, separate from a TIM.

9. The AP of claim 5, wherein the ACK frame comprises information for notifying a subsequent transmission of a group and slot information response signal in response to the PS-poll frame.

10. The AP of claim 9, wherein the ACK frame comprises information associated with a transmission time of a group and slot information response frame.

11. The AP of claim 10, wherein the transmission time is set based on an allocation section of an RAW or an allocation section of a slot.

12. The AP of claim 5, wherein a value set in the duration field is used to provide a start time of an allocated slot or a start time of a competitive RAW.

13. A method of communicating in a channel access in a wireless local area network (WLAN), the method comprising:
- transmitting, to an access point (AP), a power save (PS)-poll frame for requesting the AP to reschedule a terminal, wherein the terminal is a station that needs not to listen to a traffic indication map (TIM) beacon frame; and
- receiving, from the AP, acknowledgement (ACK) frame in response to the PS-poll frame, wherein the ACK frame comprises a duration field indicating information of a next TBTT (Target Beacon Transmit Time) associated with a wakeup time of the terminal for listening to the TIM beacon frame,
- wherein the PS-poll frame comprises an identifier indicating a request for information associated with a group identifier (ID) allocated for each restricted access window (RAW), a start time of the RAW, and an RAW duration, and
- wherein the terminal wakes up based on the information of the next TBTT and receives the TIM beacon frame based on the information of the next TBTT.

* * * * *